Patented Feb. 21, 1933

1,898,350

UNITED STATES PATENT OFFICE

TOM G. DYER, OF DES MOINES, IOWA, ASSIGNOR TO STANDARD PRODUCTS COMPANY, OF DES MOINES, IOWA, A CORPORATION OF IOWA

PROCESS OF PREPARING SUPPLEMENTAL FOOD PRODUCT

No Drawing.   Application filed September 30, 1929. Serial No. 396,410.

This invention relates to an improved dry food product designed to be used in connection with other feeds to assist in building balanced rations for poultry and live stock, and human consumption.

Stock and poultry feeders have found a great advantage in providing in feed a considerable amount of yeast and lactic acid, both of which aid in digestion as well as prevent certain diseases of the digestive organs. Heretofore the expense of yeast and lactic acid in sufficient quantities to be materially beneficial has been almost prohibitive. The lactic acid is usually provided in the form of dry buttermilk, which is usually cultured to increase the lactic acid value, and is quite expensive. The expense of commercial yeast is also practically prohibitive.

It is therefore the object of my invention to provide a dry supplemental food, which is rich in live and dormant yeast plants, and in lactic acid, and which at the same time can be produced by fermentation of glutinous cereals, in such manner that the cereals will contain a high percent of both lactic acid and yeast plants, and so that the cereals will have a normal feeding value; and Further to provide a supplemental food which may be used in connection with dry or wet feeds, and which may be used, if preferred, as a starter for producing wet feeds rich in yeast and lactic acid.

A further object is to provide a cheap and inexpensive process for producing the supplemental food above described.

In the manufacture of my improved supplemental food I find that ground wheat, bran, shorts, red dog, rye and other grains have a large percent of glutin and the best cereals for carrying out my improved process, although corn, oats and other grains may be mixed with any one or all of the above mentioned cereals to increase the feeding value.

I preferably mix with 8000 pounds of one or more of the above glutinous cereals, 1000 malted barley and 500 pounds of yeast, and sufficient water to completely saturate the solids and to maintain it in a saturated condition during the entire fermenting process.

I find that from 1.4 to 2 pounds of water to 1 pound of feed is about the right proportion.

The ingredients are thoroughly mixed and placed in suitable containers. Said containers are only partially filled with the material, as the material swells during fermentation.

The containers are then placed in a warm room and maintained preferably at a temperature of about 90° F. to 100° F., never below 70° F. or above 131° F. The material is then allowed to ferment for 24 to 48 hours, after which it is removed from the containers and spread in thin layers on screens or other suitable devices, whereby any excess moisture may drain from the solid material. The screens also assist in permitting air to come in contact with the material.

The material is then dried quite rapidly at a temperature between 90° F. and 100° F. Again, the temperature should never be below 70° F. or above 131° F., as a temperature below 70° F. or above 131° F. will kill the yeast plants. It is very desirable that the yeast plants be kept in a live and dormant condition, as otherwise they would be of no value.

The material is dried until less than 10% of the moisture remains in it, under which condition the fermentation will stop and the yeast plants maintained in a dormant condition and the food preserved against spoiling.

The material is then removed from the screens and ground to a comparatively fine powder and sacked for the trade.

The malted barley is added to the mixture on account of containing a large amount of diastase which rapidly ferments the starch of the grain to dextrose sugar or malt sugar on which the yeast plants feed and from which lactic acid is formed. The malted barley also has a high feeding value. The feeding value of the grains is slightly increased rather than descreased by my improved process, in which a large number of digestible proteins are formed.

The first four or five hours of the fermenting process is principally the formation of diastase and yeast growth, after which the development of lactic acid begins and continues to the 20th or 24th hour. From the 24th to the 48th hour no material fermentation takes place. After the 48th hour, however, further fermentation would start. It is, therefore, essential that the drying process take place between the 24th and 48th hour.

By the addition of the malted barley a large amount of diastase is added to the mixture, which results in a rapid growth of yeast plants before the formation of lactic acid starts. This results in forming in the mixture a very large percent of lactic acid, varying from 4% to 10%. In the actual manufacture of the food on a commercial basis from comparatively cheap by-product materials, such as bran, shorts and the like, the lactic acid percent usually varies from 4% to 6%.

In the actual manufacture of the food on a commercial basis, a starter of the previous batch of wet material is added to the new mixture of cereals and malted barley instead of applying commercial yeast as is necessary in the first batch.

It will readily be seen that the malted barley could be dispensed with if necessary, although the percent of lactic acid would be somewhat decreased and the speed of the fermentation somewhat decreased. In fact, a number of other agents having the ability of converting the starches of grains to dextrose sugar might be substituted for malted barley without departing from the spirit of my invention.

Neither would it be necessary to add yeast if unpolished wheat or similar cereal were used in the mixture, as the outer surface of the wheat usually contains a large amount of yeast plants from which a starter could be formed by the fermenting process.

It is important that a large amount of water be used as I find that unless enough water is used to completely saturate the material and maintain it in a saturated condition during its fermentation, the percentage of lactic acid developed is greatly decreased.

Essentially my improved method consists in mixing a glutinous cereal with water to completely saturate the same, and developing diastase and yeast under suitable temperature to maintain the yeast in a dormant and live condition, allowing the fermenting process to continue until a high percent of lactic acid has been developed, then drying the material to remove 90% or more of the moisture, then grinding the material to a powdered condition, and sacking it.

I claim as my invention:

1. The process of preparing a dry supplemental food, which comprises mixing together a number of milled cereals rich in glutin, adding diastase and yeast starters, mixing with water to completely saturate the materials, then maintaining at a temperature of 70° F. to 131° F. for a period of 24 to 48 hours to permit fermentation to multiply the yeast plants and to form lactic acid, then separating and spreading the material in thin layers and drying it rapidly at a temperature between 70° F. and 131° F. to stop fermentation without killing the yeast plants.

2. The process of preparing a dry supplemental food, which comprises mixing together a milled cereal rich in glutin, adding diastase and yeast starters, and mixing with water to completely saturate the material, maintaining the mixture at a temperature to rapidly develop the diastase and yeast and to continue the fermentation to develop lactic acid, then spreading the material into a thin layer and drying after a large percent of lactic acid has been developed to remove 90% or more of the moisture, and then grinding and sacking the material, the temperature of the mixture being so maintained through the fermentation and drying as to maintain the yeast in a live and dormant condition.

3. The process of preparing a dry supplemental food, which comprises mixing together milled and glutinous cereals with water to saturate the same, adding a yeast starter, maintaining the material at a temperature between 70° F. and 131° F. for a period of 24 to 48 hours, then spreading the material in thin layers and drying it at a temperature between 70° F. and 131° F. to remove 90% or more of the moisture.

4. The process of preparing a dry supplemental food, which comprises mixing together a glutinous unpolished cereal with a diastase starter and water to saturate the material, maintaining the mixture at a temperature between 70° F. and 131° F. to cause fermentation and to develop the diastase and inherent yeast and continuing the fermentation for a period of 24 to 48 hours, and then separating and drying the material at a temperature between 70° and 131° F. to remove 90% or more moisture.

5. The process of preparing a dry supplemental food, which comprises mixing together a glutinous cereal with a non-glutinous cereal, adding malted barley and a yeast starter, mixing the material with water to completely saturate the same, then maintaining the material at a temperature of 70% F. to 131° F. for a pediod of 24 to 48 hours to cause fermentation and to develop lactic acid, then separating and drying the material at a temperature of 70° F. to 131° F. to remove 90% or more of the moisture, and then grinding and sacking the material.

6. The process of preparing a dry supplemental food, which comprises mixing together 8000 pounds of milled cereals, some of which are rich in glutin, 1000 pounds malted barley, and 500 pounds of commercial yeast or its equivalent in yeast starter, then placing the material in a suitable container and maintaining the same at a temperature of 70° F. to 131° F. for a period of approximately 20 hours or more, then removing the material and spreading it in thin layers and drying it at a temperature of 70° F. to 131° F. until 90% or more of the moisture has been removed, and then grinding and sacking the material.

7. The process of preparing a dry supplemental food, which comprises mixing with a glutinous cereal just a sufficient amount of water to completely saturate it and to maintain the material in a saturated condition during a period of fermentation, then developing yeast and lactic acid by fermentation, and spreading the material in a thin layer and drying to remove 90% or more moisture, the temperature maintained during the fermentation and drying periods being such as to preserve the yeast in a live condition.

8. The process of preparing a dry supplemental food which comprises mixing with a glutinous cereal water to completely saturate it and to maintain the material in a saturated condition during the period of fermentation, then developing yeast and lactic acid by fermentation, separating the fermented material and drying to remove 90% or more moisture, the temperature maintained during the drying and fermentation periods being such as to preserve the yeast in a live condition.

TOM G. DYER.